United States Patent
Malks et al.

(10) Patent No.: US 8,458,596 B1
(45) Date of Patent: Jun. 4, 2013

(54) METHOD AND APPARATUS FOR A MASHUP DASHBOARD

(75) Inventors: Daniel Malks, Arlington, VA (US); Jeremy Pitten, Penarth (GB)

(73) Assignee: JackBe Corporation, Chevy Chase, MD (US)

( * ) Notice: Subject to any disclaimer, the term of this patent is extended or adjusted under 35 U.S.C. 154(b) by 188 days.

(21) Appl. No.: 12/763,517

(22) Filed: Apr. 20, 2010

Related U.S. Application Data

(60) Provisional application No. 61/171,370, filed on Apr. 21, 2009.

(51) Int. Cl.
*G06F 3/00* (2006.01)

(52) U.S. Cl.
USPC .......................................... 715/742; 715/743

(58) Field of Classification Search
USPC ................................. 715/741, 742, 866, 743
See application file for complete search history.

(56) References Cited

U.S. PATENT DOCUMENTS

| | | | |
|---|---|---|---|
| 4,914,586 A | 4/1990 | Swinehart et al. | |
| 6,119,135 A | 9/2000 | Helfman | |
| 6,674,447 B1 | 1/2004 | Chiang et al. | |
| 6,684,207 B1 | 1/2004 | Greenfield et al. | |
| 6,760,306 B1 | 7/2004 | Pan et al. | |
| 7,149,982 B1 | 12/2006 | Duperrouzel et al. | |
| 7,434,229 B2 | 10/2008 | Barinov et al. | |
| 7,536,413 B1 | 5/2009 | Mohan et al. | |
| 7,788,251 B2 | 8/2010 | Carlson et al. | |
| 7,831,559 B1 | 11/2010 | Mohan et al. | |
| 7,904,818 B2 | 3/2011 | Lauridsen et al. | |
| 8,321,792 B1 | 11/2012 | Alur et al. | |
| 8,397,056 B1 | 3/2013 | Malks et al. | |
| 2001/0028368 A1 | 10/2001 | Swartz et al. | |
| 2002/0178119 A1 | 11/2002 | Griffin et al. | |
| 2003/0117437 A1* | 6/2003 | Cook et al. | 345/764 |
| 2003/0197726 A1 | 10/2003 | Weitzman | |
| 2004/0183831 A1* | 9/2004 | Ritchy et al. | 345/762 |
| 2004/0207659 A1 | 10/2004 | Goodman et al. | |
| 2004/0221296 A1 | 11/2004 | Ogielski et al. | |
| 2005/0166180 A1 | 7/2005 | Lemon et al. | |
| 2005/0278323 A1 | 12/2005 | Horvitz et al. | |
| 2007/0067722 A1* | 3/2007 | Ames et al. | 715/709 |

(Continued)

OTHER PUBLICATIONS

Tyler Close, "Web-key: Mashing with Permission," Hewlett-Packard Labs, (2008), presented on Apr. 21-25, 2008, Beijing, China, pp. 1-8.

(Continued)

*Primary Examiner* — Omar Abdul-Ali
(74) *Attorney, Agent, or Firm* — Posz Law Group, PLC

(57) ABSTRACT

A system, computer-readable medium, and computer-implemented method for using a mashup dashboard can include retrieving a mashup dashboard from a repository, and providing a display of the retrieved mashup dashboard that recreates a visual configuration pre-defined in the stored mashup dashboard. The visual configuration includes a pre-defined mashup executing therein to provide live data from the mashup. The mashup dashboard can be created, by providing a listing of pre-defined mashups and a canvas, the pre-defined mashups being stored in a repository; interacting with the user to define a visual configuration of the canvas and to drag and drop one of the pre-defined mashups from the listing onto the canvas; and storing the visual configuration of the canvas with the pre-defined mashup as a mashup dashboard, for later retrieval to recreate the visual configuration with the pre-defined mashup executing therein.

24 Claims, 4 Drawing Sheets

U.S. PATENT DOCUMENTS

| | | | |
|---|---|---|---|
| 2007/0112955 A1 | 5/2007 | Clemm et al. | |
| 2007/0130541 A1* | 6/2007 | Louch et al. | 715/804 |
| 2007/0162850 A1* | 7/2007 | Adler et al. | 715/700 |
| 2007/0162936 A1 | 7/2007 | Stallings et al. | |
| 2007/0240063 A1* | 10/2007 | Cheng et al. | 715/741 |
| 2007/0282673 A1* | 12/2007 | Nagpal et al. | 705/11 |
| 2008/0016232 A1 | 1/2008 | Yared et al. | |
| 2008/0034314 A1* | 2/2008 | Louch et al. | 715/778 |
| 2008/0215675 A1 | 9/2008 | Kaminitz et al. | |
| 2008/0270929 A1 | 10/2008 | Bohn et al. | |
| 2009/0157728 A1 | 6/2009 | Fletcher et al. | |
| 2009/0205029 A1 | 8/2009 | Noda et al. | |
| 2009/0235285 A1 | 9/2009 | Kim et al. | |
| 2009/0265362 A1 | 10/2009 | Parsons et al. | |
| 2009/0313601 A1 | 12/2009 | Baird et al. | |
| 2009/0328137 A1 | 12/2009 | Liang et al. | |
| 2009/0328205 A1 | 12/2009 | Ims et al. | |
| 2010/0034258 A1 | 2/2010 | Pandit et al. | |
| 2010/0042973 A1 | 2/2010 | Anderson et al. | |
| 2010/0070925 A1 | 3/2010 | Einaudi et al. | |
| 2010/0082989 A1 | 4/2010 | Bussard et al. | |
| 2010/0269149 A1 | 10/2010 | Lee et al. | |

OTHER PUBLICATIONS

"Design pattern in simple examples," Jul. 5, 2007, http://www.go4expert.com/forums/showthread.php?t=5127, pp. 1-53.

Office Action issued by the U.S. Patent Office on Dec. 22, 2011 in connection with related U.S. Appl. No. 12/763,798.

Office Action mailed by the U.S. Patent Office on Dec. 30, 2011 in connection with related U.S. Appl. No. 12/763,724.

Office Action issued by the U.S. Patent Office on Jun. 8, 2012 in connection with related U.S. Appl. No. 12/763,582.

Notice of Allowance issued by the U.S. Patent Office on Aug. 8, 2012 in connection with related U.S. Appl. No. 12/763,798.

Office Action issued by the U.S. Patent Office on Sep. 11, 2012 in connection with related U.S. Appl. No. 12/890,224.

U.S. Appl. No. 13/759,632, Feb. 5, 2013, Malks et al.

Magazinius et al., "A Lattice-based Approach to Mashup Security", Apr. 2012, pp. 15-23.

Notice of Allowance issued by the U.S. Patent Office on Dec. 26, 2012 in connection with related U.S. Appl. No. 12/763,582.

* cited by examiner

METHOD AND APPARATUS FOR A MASHUP DASHBOARD

CROSS-REFERENCE TO RELATED APPLICATIONS

This application claims the benefit of the following Provisional application 61/171,370 filed Apr. 21, 2009, which is expressly incorporated herein by reference.

TECHNICAL FIELD

The technical field relates in general to computer networks, and more specifically to mashups and providing a dashboard for mashups.

BACKGROUND

A business that uses software to track and manage its corporate information might want to rapidly and securely combine multiple information sources both internal to and external to their organization. Businesses today lack the ability to rapidly create, publish, and share dynamic, enterprise mashup-driven dashboards for their users.

Businesses want a no-code visual environment to create these mashup dashboards and want their users to discover these mashup dashboards, easily leveraging them within their existing, environments. Moreover, it would benefit businesses to have strong control over the user-level access control policies that restrict or allow use of this information. Finally, businesses prefer solutions that are as open and cross-platform as possible.

Previous attempts at solving this problem rely on non-mashup-based approaches. Previous solutions are relatively static, typically require moving data into a central data store, and are not rapidly created. Previous solutions typically are targeted to a specific product or set of products, such as a specific vendor product (such as Microsoft SharePoint) or an Enterprise Portal.

SUMMARY

Accordingly, one or more embodiments provide a computer system, including a display interface; a user input device interface. The processor can be cooperatively operable with the display interface and the user input device interface. The processor can be configured to facilitate: providing, via the display interface, a listing of pre-defined mashups and a canvas, the pre-defined mashups being stored in a repository; interacting with a user via the display interface and the user input device interface to define a visual configuration of the canvas and to drag and drop one of the pre-defined mashups from the listing onto the canvas; and storing, in the repository, the visual configuration of the canvas with the pre-defined mashup as a mashup dashboard, for later retrieval to recreate the visual configuration with the pre-defined mashup executing therein.

According to further embodiments, a same mashup dashboard being re-schemed for different users, while a tab configuration and layout of the same mashup dashboard is persistent for the different users.

According to still another embodiment, the mashup dashboard further comprises a security policy for an individual mashup in the mashup dashboard that limits who can use the mashup from the mashup dashboard, the security policy being separate from a policy provided in the mashup itself.

According to yet another embodiment, the mashup dashboard further comprises a security policy for a specific user interface area that appears in the mashup dashboard that prevents the specific user interface area from appearing for an unpermitted user.

Another embodiment comprises the mashup dashboard interacting with the user to selectively plug in mashups from the repository by manual manipulation at the display interface.

Still another embodiment supports saving a state of the mashup dashboard as a workspace app, and sharing the workspace app with other users of the dashboard by which the other users recreate a same visualized instance of the dashboard.

In another embodiment, the mashup dashboard surfaces a parameter in the mashup into the dashboard to be exposed to the user, and the parameter while in the mashup interacts with the user.

Still another embodiment provides for retrieving a mashup dashboard from a repository; and providing, via a display interface, a display of the retrieved mashup dashboard that recreates a visual configuration pre-defined in the stored mashup dashboard, the visual configuration including a pre-defined mashup executing therein to provide live data from the mashup.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages.

DETAILED DESCRIPTION

Figure 1:
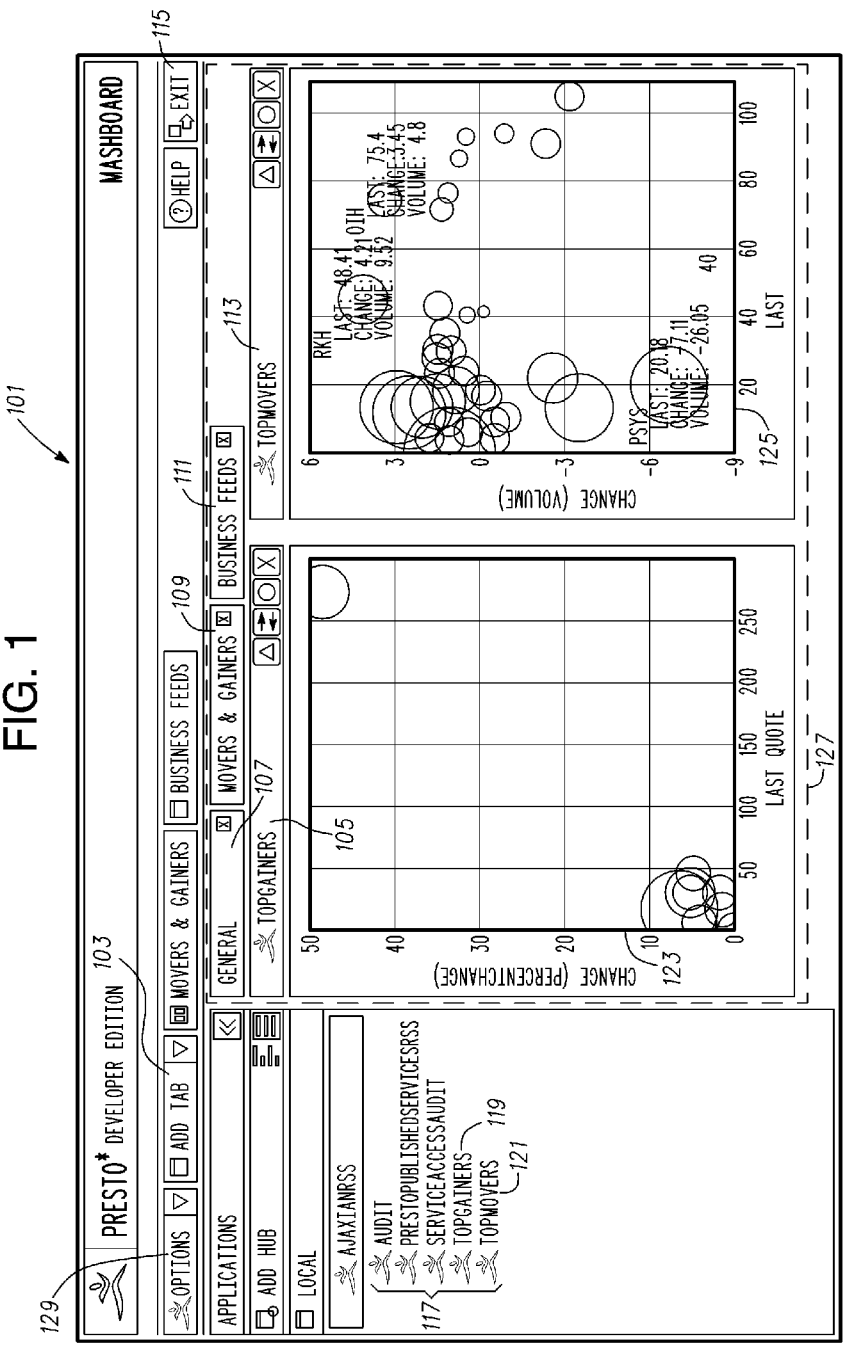
FIG. 1 is an illustration of an example user interface with a mashup dashboard.

In overview, the present disclosure concerns computer systems, sometimes referred to as client/server networks, such as may be associated with computer systems providing mashups. Such computer systems often involve running a mashup on a user's computer that provides a user interface on the user's computer and that communicates as a client with a mashup server that invokes the desired web service specified by the mashup, the web service providing live data through the mashup client/server, so that the live data can be used according to the mashup without regard to user interface formatting specified by the web service. More particularly, various inventive concepts and principles are embodied in systems, devices, and methods therein for creating and/or using mashups within in a pre-determined visualization sometimes referred to as a dashboard.

The computer systems of particular interest are those providing or facilitating mashups over computer networks involving a mashup server and a mashup client, and the like, and variants or evolutions thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to support the creation of dynamic dashboards that are mashup based and configurable, and to provide a collaboration environment for the secure sharing of dashboards and mashup-based dashboard components and component information. Software developers, for example, also can be provided mashup dashboard APIs to programatically modify and extend the environment.

Further in accordance with exemplary embodiments, there is provided an enterprise mashup-based dashboard, which is dynamic and does not require duplication of data or moving of data from its original storage location. This solution can allow for the creation of dashboards that support the viewing of combinations of data from inside and outside the corporate firewall, of structured and unstructured data; and can provide for rapid solutions that provide strong business context. This solution can allow for the creation of mashup dashboards without requiring custom coding, using visual drag & drop web-based tooling. The resulting dashboards do not rely on duplication of data nor the moving of data from existing data stores to a new central repository and can be created rapidly. Moreover, this solution can be compatible with web standard-compatible publishing environments (for example Enterprise Portals), specific vendor products (such as SharePoint), Wikis, Blogs, plain HTML pages, mobile devices, and the like.

The mashup dashboard designer can be highly user-driven and configurable, and can provide a framework for extensibility supporting one or more of the following areas:

Designing Mashup Dashboards with specific themes and Look and Feel

Designing Mashup Dashboards with multiple tabbed layouts and nested content

Designing Mashup Dashboards with various, pluggable, layout managers, supporting both column-based and more free form layouts The solution can support the creation of user-specific mashup dashboards, with customizations that can be published, discovered, and shared in a collaborative manner.

The mashup dashboard designer can support collaboration and sharing of mashups, allowing users to customize/configure dashboards as mashup apps and to share the resulting apps with other users.

The dashboard designer can provide access control based on user types, limiting what type of user can view which portions of the dashboard designer.

The mashup dashboard designer not only can support stand-alone use but can be embedded in other environments as an embeddable component, as the resulting dashboards are published from the designer.

Numerous aspects can include but are not limited to the following:

Visual mashup components for dynamically displaying of mashup information within the dashboard Dynamic contextualization to mashup data Attribute based social sharing Inter-component communication framework Visual tooling for Inter-component communication framework Application Programming Interface for creating, modifying, deleting user's visual environment.

Application Programming Interface for creating and storing dashboard profiles

Referring now to FIG. 1, an illustration of an example user interface with a mashup dashboard will be discussed and described. FIG. 1 shows a user interface 101. The user interface includes a listing 117 of pre-defined mashups (e.g., Top-Movers mashup 119, Top Gainers mashup 121) and a canvas 127 (the display area indicated by the dashed line for illustration purposes).

The user interface 101 can interact with a user, for example, by commands such as "Add Tab" 103 or which may be provided as a drop down menu such as under the "Options" tab 129. Tabs and drop down menu techniques are generally known.

The user interface 101 can provide the listing 117 of available pre-defined mashups, mashlets, and other elements which can be included in a dashboard. The user can interact with the user interface 101 to selectively drag and drop any of the pre-defined mashups, mashlets, and other elements in the listing 117 onto the canvas 127, and to configure the display of the canvas 127 and mashups 123, 125, mashlets and other elements on the canvas 127. Using the commands (such as "Add Tab" 103 or the "Options" drop down menu 129), the user can specify visualization such as color, tab configuration, fonts, relative sizing within the canvas 127, relative positioning within the canvas 127. Mashups that are drag and dropped onto the canvas execute (using conventional mashup techniques) to provide current live data. When a user is satisfied with the visual appearance and contents of the canvas 127, the user can save this as a mashup dashboard, for example by exiting 115.

The mashup dashboard can be published using standard techniques, so that it can later be retrieved and used by the same and/or other users. When the mashup dashboard is later retrieved and used, the visual appearance and contents of the canvas 127 is recreated on the user interface 101, and the mashups in the mashup dashboard provide current live data at the time the mashup dashboard is currently used.

The representative example illustrated in FIG. 1 illustrates, on the lefthand side, the listing 117 of mashup visualizations or mashlets or apps. These are component pieces from which a user can build and design and configure the dashboard within the canvas 127. In the listing 117 on the left are mashups including "TopMovers" 121 and "Top Gainers" 119.

To design the dashboard illustrated here, the user created some new tabs in the canvas 127 by using the "Add Tab" 103 command: "Movers & Gainers" tab 109, "General" tab 107, and "Business Feeds" tab 111. The "Add Tab" command 103 creates the tab within the canvas 127 and inserts a user-specified description, in accordance with known techniques. Accordingly, the use can decide which tabs are included, in this case, "Movers & Gainers".

Then, the user can interface with the UI 101 to click on the listing 117 on the left on "Top Gainers" 119; drag the "Top Gainers" (or a representative icon) and drop it on to the canvas 127 on the right side of the UI. Then, the "Top Gainers" mashup is rendered on the canvas 127 as the widget "Top Gainers", according to known techniques, within a "Top Gainers" tab 105.

Similarly, the user then clicked on "TopMovers" 121 in the listing 117, dragged over the "TopMovers" 121 and dropped it onto the canvas 127. That renders itself on the canvas on the right as the "TopMovers" widget 125 within a "TopMovers" tab 113.

The user can change the layout of the canvas 127, for example so that it had one skinny column on the left and one wide column on the right, or two columns the same size. Also, the widets 123, 125 can be dragged around within the page. For example, the "TopMovers" widget 125 could be dragged from the right to the left hand side where it would displace the "Top Gainers" widget 123 toward the right side. Similarly, the user can drag the "Top Gainers" widget 123 down below to a second row. The widgets 123, 125 within the canvas 127 can be drag and dropped to reconfigure the visualization of the canvas 127.

Also, in the UI, the user can see pre-determined spacing in a layout of the canvas 127, which is selectable, to get more or less spacing between items visualized on the canvas 127; to add/change chrome into the layout; to add/change headers in the layout; to add/change header bars in the layout; to add/change tabs in the layout on the canvas.

Once the canvas 127 is laid out and configured as desired, the user can go to the menu on the user interface 101 to save it as a mashup dashboard. The user interface 101 can prompt the user for a name (here, hidden as a pull down menu option under the "EXIT" button 115).

Also, the user interface 107 can provide an option to create a workspace (not illustrated), so that the mashup dashboard, which is stored, can be shared with other users.

A mashup dashboard can be driven through certain APIs that are in the mashup server. That is, the mashup dashboard can be distributed so that it is partially a user interface piece on a mashup client, and partially a server piece on a mashup server. The user interface 101 portion can be viewed in the user's browser (for example, Windows browser). Some elements of the mashup dashboard can perform independently of server-side pieces, for example using a mashup application such as PRESTO software, available from JackBe Corporation.

The user interface 101 which displays the mashup dashboard and the repository on which the mashups (such as in the listing 117) are stored (which is conventionally provided on a mashup server) can have a cooperative interaction.

The user interface 101 for creating a mashup dashboard differs from other conventional dashboard designers by allowing the user to selectively plug in from mashup repositories, by dragging and dropping artifacts representing repository content as one example of selectively plugging in a mashup repository by manual manipulation at the user interface.

Also, the user interface 101 for creating the mashup dashboard can apply security policies for each artifact, an artifact representing an individual item that can be drag-and-dropped into a particular mashup. The security policy can be associated with an individual artifact (such as an individual mashup), and can define who can use each artifact. The user interface 101 can interact with the user, such as by the options 129 drop down menu, to specify security policies.

Similarly, the user interface 101 for the mashup dashboard can not only limit access to the artifacts, but also limit access to pieces of the dashboard user interface 101 (e.g., specific mashup dashboard or tabs), with certain artifacts showing up (or not) in the mashup dashboard when used by another user depending on the access which the mashup dashboard permits the user. The user interface 101 can interact with the user, such as by the options 129 drop down menu, to specify security policies to be applied to which areas of the canvas 127.

The mashup dashboard can be extensible. That is, the user can create a look and feel and branding which is associated with the user (or a group to which the user belongs or a role of the user). When the user creates or uses a mashup dashboard, the user interface 101 can check for and utilize a configuration file and application programming, Java script, and the like specified for the user (or user group, or user role) to enable the extensibility, using the mashup API underneath to do the extensibility.

A mashup dashboard is sometimes referred to as a mashup workspace or workspace app. The workspace app can be shared with other users who can also collaborate on the shared dashboard, modifying it, adding to it, or using it within other dashboards, for example when a collaborative usage is policy enabled.

A state of the mashup dashboard can includes one or more tabbed pages of content, the mashups on each of the pages, and at least some elements of those included "components" (also referred to herein as "artifacts") on each tab. (For example, in the illustration of FIG. 1, the state of the mashup dashboard can indicate the illustrated bubble chart, and which three stocks are shown on the bubble chart.)

When creating a dashboard, the system can discover one or more repositories of mashup components, such as MASHLETS™ components available from JackBe Corporation and/or mashups created by other users. More particularly, the dashboard designer itself can be an embeddable component that can be used not only stand-alone but also within another dashboard.

There can be provided a visual framework on the user interface that can execute and display the mashup components (e.g., the illustrated bubble charts). For example, a first dashboard can be drag-and-dropped by a user into a second dashboard. The first dashboard can be treated as just another one of the mashup components within the second dashboard.

This allows a user to build a dashboard that can be embedded into a different user's dashboard.

The content of the data within the components of a shared mashup dashboard can itself be shared between the components while running within the mashup dashboard. The mashup within the dashboard retrieves real time data from the original source (for example, using the original information service which can provide live data) in accordance with known techniques. Hence, the data which is viewed through two or more mashup dashboards that are shared is passed through from the same originating source to each of the mashup dashboards. Consequently, the information can look the same and be displayed the same on each of the shared mashup dashboards. This can be true even if the shared mashup dashboard is embedded in another different dashboard.

The mashup components on the dashboard further can communicate with each other. In operation, on the dashboard user interface 101, a user selects a first one of the mashup components in the listing 117, drags it to a second one of the mashup components 123, 125 such as in the canvas 127, and the system can interact with the user such as via a wizard (using known techniques) to allow the user to specify which information from the first mashup component should be exposed to the second mashup component, and how data of the first mashup component can be mapped into the data and visuals of the second mashup component. Once set up, the second mashup component can listen for the specified data (for example, use zipcode data), and react to the specified data and/or notify the user of the specified data (for example, show a pushpin at an address), or otherwise incorporate the data into the second mashup component. Consequently, the mashup components within the mashup dashboard can intercommunicate with each other. The first one of the mashup components is publishing the specified data, whereas the second one of the mashup components is subscribing to the information and updating its visualization from the information. This can allow a user to easily set up and update an interactive dashboard.

The mashup dashboard designer and the resulting published mashup dashboards can appear in a web browser, can be embedded into a wiki or blog by using a single line scriptlet tag, and the like.

Dashboards designed and published using this solution can become part of a catalog of reusable and shareable dashboards or apps that are stored in a repository. These dashboards can be discovered by other users and embedded in other dashboards, for example when the users of the other dashboards have the appropriate privileges. Access to published mashup dashboards can be restricted to specific users and/or specific groups of users.

Access control can be enforced at numerous levels, including access to the dashboard designer, access to the published mashup dashboards as a whole, or to content within each mashup dashboard.

The dashboard designer and resulting published mashup dashboards can support an organizations existing access management approach. For example, if an organization has an infrastructure for log-in, authentication and authorization, the dashboard designer and resulting mashup dashboards can support the same control mechanisms. That is, mashup dashboards can be set up to request authentication (password, sign-on solution, and the like) and authorization.

Figure 2:
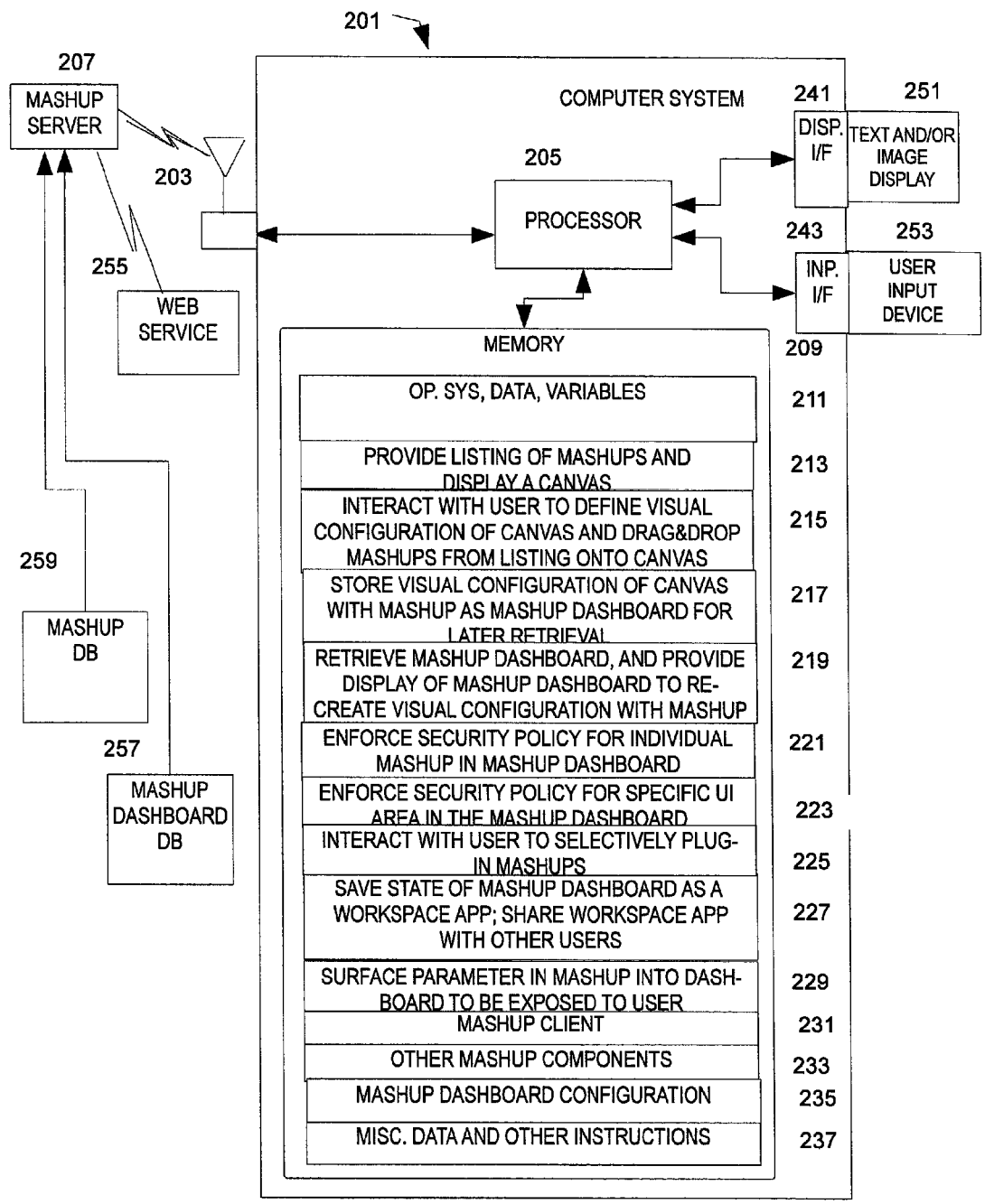
FIG. 2 is a block diagram illustrating portions of an exemplary computer system for a mashup dashboard

Referring now to FIG. 2, a block diagram illustrating portions of an exemplary computer system for a mashup dashboard will be discussed and described. The computer system 201 may include a communication port and/or transceiver 203 or the like for communication with a mashup server 207, a processor 205, a memory 209, a display interface 241 and a display 251, an optional input interface 243 and a user input device 253 such as a keyboard.

The processor 205 may comprise one or more microprocessors and/or one or more digital signal processors. The memory 209 may be coupled to the processor 205 and may comprise a read-only memory (ROM), a random-access memory (RAM), a programmable ROM (PROM), and/or an electrically erasable read-only memory (EEPROM). The memory 209 may include multiple memory locations for storing, among other things, an operating system, data and variables 211 for programs executed by the processor 205; computer programs for causing the processor to operate in connection with various functions such as to provide 213 a listing of mashups and to display a canvas; to interact 215 with a user to define a visual configuration of the canvas and draft and drop mashups from the listing onto the canvas; to store 217 the visual configuration of the canvas with the mashup as a mashup dashboard for later retrieval; to retrieve 219 the mashup dashboard, and provide the display of the mashup dashboard so as to recreate the visual configuration with the mashup therein; to enforce 221 the security policy for individual mashup in the mashup dashboard; to enforce 223 the security policy for a specific user interface area in the mashup dashboard; to interact 225 with the user to selectively plug-in mashups; to stave 227 the state of the mashup dashboard as a workspace app, and share the workspace app with other users; to surface 229 a parameter in the mashup into the dashboard to be exposed to the user; a mashup client 231, and/or other processing; other mashup components 233; a temporary buffer for mashup dashboard configuration 235; and miscellaneous data and other instructions 237 used by the processor 205. The computer programs may be stored, for example, in ROM or PROM and may direct the processor 205 in controlling the operation of the computer system 201.

The user may invoke functions accessible through the user input device 253, interfaced with the processor 205 through an input interface 243. The user input device 253 may comprise one or more of various known input devices, such as a keyboard and/or a pointing device, such as a mouse; the keyboard may be supplemented or replaced with a scanner, card reader, or other data input device; the pointing device may be a mouse, touch pad control device, track ball device, or any other type of pointing device; and the input interface 243 can be a known interface thereof to communicate with the processor 205.

The text and/or image display 251 is representative of a display that may present information to the user by way of a conventional liquid crystal display (LCD) or other visual display, and/or by way of a conventional audible device for playing out audible messages.

Responsive to signaling from the user input device 253, in accordance with instructions stored in memory 209, or automatically upon receipt of certain information via the communication port and/or transceiver 203, the processor 205 may direct the execution of the stored programs.

The mashup server 207 can be a part of a mashup platform comprising the computer system 201 with a mashup client 231 that can execute on the processor 205 and the mashup server 207, according to known techniques. Mashup server and mashup client functions can be distributed to the mashup server 207 and/or the computer system 201 with the mashup client 231, as will be appreciated by one of skill in this field. Accordingly, the user may invoke functions through the user input device 253 on the computer system 201, and information may be presented to the user through the display 251 on the computer system 201. Details which are not presently relevant are omitted from the present description. The mashup server 207 can invoke services (represented here by a web service 255) such as web services and the like, according to known techniques. Real time data from the web service 255 can be sent to the mashup client 231 (running on the computer system 201) via the mashup server 207 according to known techniques.

The mashup server 207 can access a mashup database 259 on which mashups can be stored (according to known techniques), and a mashup dashboard database 257 on which mashup dashboards can be stored as further described herein. Although the present example illustrates separate databases for the mashup dashboards 257 and the mashups 259, the mashup dashboards can be stored in the same database as the mashups.

The processor 205 can be programmed to provide 213 a listing of mashups and to display a canvas. The computer system 201 can discover a listing of available mashups (and mashlets, apps, widgets) from the mashup server 207. Optionally, the user can interact with the computer system 201 to point at different repositories of these such as the mashup database 259 to discover them, and then they can be enumerated by being listed. Also, the preliminary canvas can be displayed to the user.

The processor 205 can be programmed to interact 215 with a user to define a visual configuration of the canvas and draft and drop mashups from the listing onto the canvas. By using the display interface 241 and input interface 243 (collectively, the user interface), the computer system 201 can allow the user to design dashboards with different looks and feels, different themes (e.g., different colors) different layouts, different pluggable layout manager (for example, different column widths), ability to drag around in the page or not, and the like. Moreover, the visual configuration can provide extensibility so a user can plug in user-defined features; for example the mashup dashboard can provide the ability to have post-it notes pop up, write notes, and have those stick conceptually to the dashboard. Conventional techniques provide to drag and drop and for designing a visual configuration of a canvas.

The mashup dashboard can have a scheme associated with specific users, so that the mashup dashboard can be re-schemed for different users. A user can have a different configuration, such as different themes (different color schemes), different look and feel, and the like. Different users can have different schemes. As another example, the user can cause the dashboard to be defined to look one way based on certain access and a different way based on a different access. That can be stored in the mashup server together with the dashboard.

Some companies claim to do mashup dashboards. What these companies mean is, they take two data sets and visually overlay them, such as on a map. The ability to take two different data sets which remain different on a visual display is what they consider to be a mashup, but it is merely a visual overlay of information. Here the mashup dashboard can be created using mashups that are dynamic, that pull and integrate information together from different sources. For example, consider that the first data set from the first mashup does not have information about latitude/longitude but has a FIPS (Federal Information Processing System) code, and the second dataset from the second mashup has latitude/longitude but not FIPS code. The first data set provided by the first mashup can be resolved using a known mashup resolver service (e.g., FIPS to latitude/longitude), the two data sets can be resolved and combined by specifying the first and second mashups as well as the mashup resolver service, and then the resolved combined data sets can be plotted. Another known technique for resolving data sets is a spreadsheet.

Consequently, without writing custom code, a user can create mashup dashboards around disparate information, and then can design their own dashboards by dragging and dropping combinations of these out onto the canvas in different layouts. The user can interact with the computer system 201 and can set different decorations on it, themes, look and feel, adjust the sizing between widgets, positioning the page, whether or not they have certain types of chrome (decoration around the widget itself). A user can configure all of these things by just pointing and clicking.

The processor 205 can be programmed to store 217 the visual configuration of the canvas with the mashup as a mashup dashboard for later retrieval. Once the mashup dashboard is created, the user can save and publish it out and share it with others. The mashup dashboard can be published using known publication techniques, such as to a Java portal, Microsoft SharePoint, to Google (for example using iGoogle or Google gadget).

The dashboard is actually a widget (and hence itself can be a reusable component that is discoverable and useable just like a mashlet that was used to create the dashboard). The dashboard is stored at the mashup server 207 as a discoverable widget. Then, the newly created dashboard itself can be dragged out onto the dashboard that can be used in another composite mashup dashboard.

The database can be a hierarchical database, for example, a Presto repository (available from JackBe). The configuration, e.g., the look and feel of the dashboard page itself, can be stored. As in a conventional web page, the configuration information specifies how to recreate that page, including where the buttons and widgets and colors and menus go.

The processor 205 can be programmed to retrieve 219 the mashup dashboard, and provide the display of the mashup dashboard so as to recreate the visual configuration with the mashup therein. As with a conventional web page, the configuration information that was stored is retrieved and the buttons, widgets, colors, menus, and the like are displayed to the user interface, and the mashups are run with their respective displays laid out as specified in the configuration information.

The processor 205 can be programmed to enforce 221 the security policy for individual mashup in the mashup dashboard. Also, the processor 205 can be programmed to enforce 223 the security policy for a specific user interface area in the mashup dashboard; That is, portions of the mashup dashboard can allow access to certain people and certain pieces. So, some users might not have access to portions of the dashboard at all, whereas other users might have access to create mashup dashboards, and still other users might unlimited access. The limitation of access can be policy driven, based on user's group (e.g., administrators, etc.). Policies can be applied to the resulting dashboard. The fact that there is a policy associated with the dashboard can be stored with the dashboard. Limiting or allowing access can be applied to whether a user is allowed to create or edit mashup dashboards, as well as to accessibility to the dashboards themselves and areas within the dashboards.

The processor 205 can be programmed to interact 225 with the user to selectively plug-in mashups. That is, the user can manually manipulate the display 251 and user input device 253 to drag and drop artifacts representing repository content, thereby selectively plugging in a mashup repository.

The processor 205 can be programmed to save 227 the state of the mashup dashboard as a workspace app, and share the workspace app with other users. Different users opening the same mashup dashboard will have the same visual experience. When the workspace app is shared with another user, the other user can see current real-time data. The workspace app can be shared in a number of different conventional ways, for example by being published (e.g., when it is saved); by being listed as a mashup widget in a listing of mashlet visualizations/apps, by being can be published to a site in SharePoint, by being shared via JackBe PRESTO software, by being accessed via URL, and the like.

The processor 205 can be programmed to surface 229 a parameter in the mashup into the dashboard to be exposed to the user. Consider that a user of the dashboard may wish to pass information into a mashup within the dashboard. If the dashboard exposes an input parameter of a mashup, so that the input values of the mashup within the dashboard are surfaced up into the whole dashboard, an input value then can be pushed down to one of the component pieces (to the mashup). Conventionally, HTML entities on a page can be interacted with, but only when at the outer level. Hence, there is no way to pass information to a mashup in a dashboard unless the dashboard exposes/surfaces those parameters up to the outer containing widget (that is, the dashboard). Using conventional techniques, the dashboard can be published to do communication between specified widgets on a page. When the dashboard is used, it then can take an input parameter and pass it into the underlying component (e.g., search widget). Without that, the outer container (that is, the dashboard) would not be able to do receive input and pass it to the mashup inside the container. By publishing the containing environment with communication to a contained piece, the containing environments can then interact with one or more of the contained pieces in the dashboards that are generated.

The processor 205 can be programmed with a mashup client 231. That is, the mashup can be provided according to known techniques when a user invokes a service or a mashup. As is known, the invocation of the mashup can be performed via the mashup platform which comprises the mashup client 231 executing on the computer system 201, and the mashup server 207, sometimes requiring the system to display information to a user and/or to interact with the user to input data via the user input device 253 and/or display 251 on the computer system 201.

The computer system 201 can include a central processing unit (CPU) with disk drives (not illustrated), symbolic of a number of disk drives that might be accommodated by the computer. Typically, these might be one or more of the following: a floppy disk drive, a hard disk drive, and a CD ROM or digital video disk. The number and type of drives may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external.

It should be understood that FIG. 2 is described in connection with logical groupings of functions or resources. One or more of these logical groupings may be omitted from one or more embodiments. Likewise, functions may be grouped differently, combined, or augmented without parting from the scope. For example, computer system 201 does not need to support for creating a mashup dashboard and running a mashup dashboard. Similarly the present description may describe various databases or collections of data and information. One or more groupings of the data or information may be omitted, distributed, combined, or augmented, or provided locally and/or remotely without departing from the scope of the invention.

Figure 3:
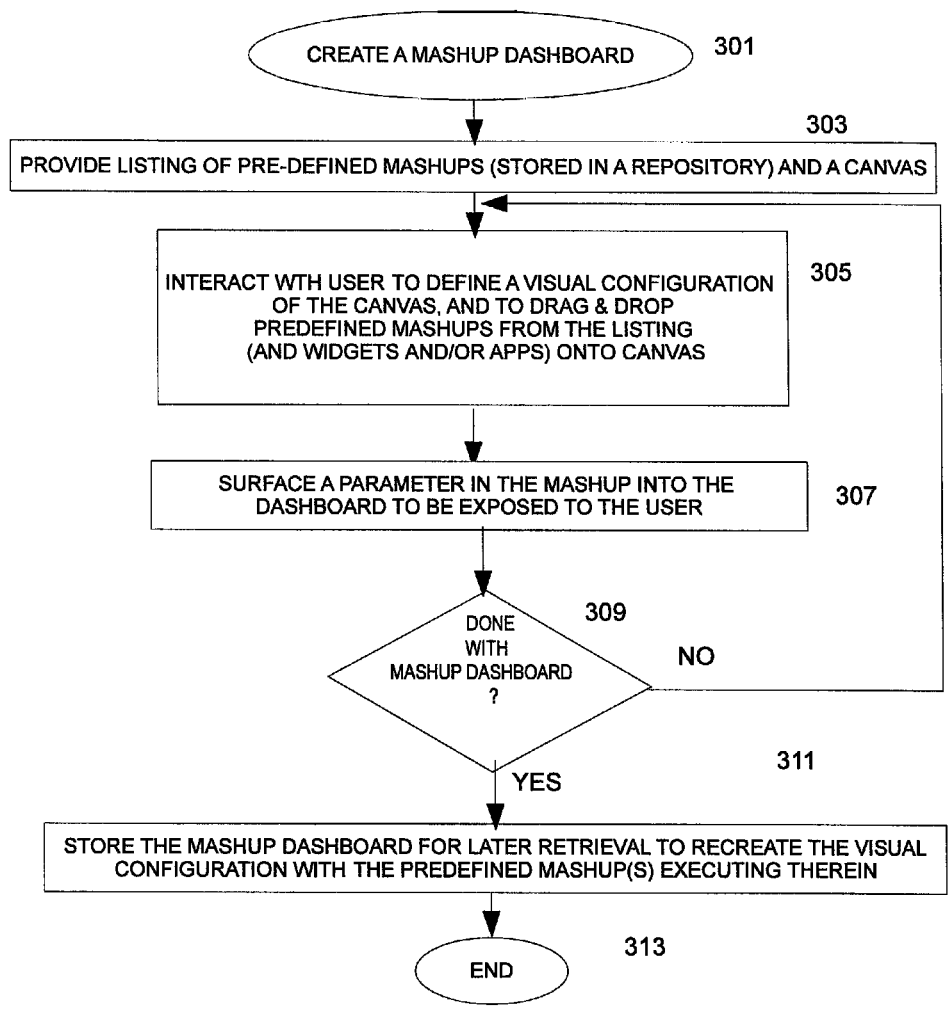
FIG. 3 is a flow chart illustrating a procedure to create a mashup dashboard.
Figure 4:
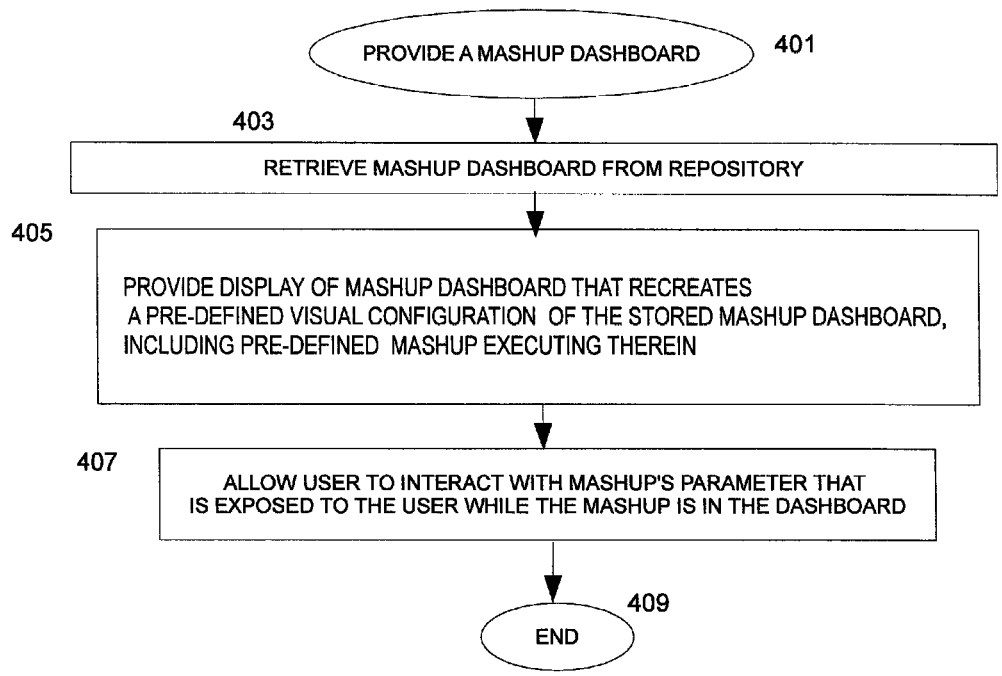
FIG. 4 is a flow chart illustrating a procedure to use a mashup dashboard.

FIG. 3 is a procedure to create a mashup dashboard, and FIG. 4 is a procedure to use a mashup dashboard once it has been created. The procedures of FIG. 3 and FIG. 4 can advantageously be implemented on, for example, a processor of a computer system and/or mashup server described in connection with FIG. 2 or other apparatus appropriately arranged.

Referring now to FIG. 3, a flow chart illustrating a procedure 301 to create a mashup dashboard will be discussed and described. In overview, the procedure 301 includes providing 303 a listing of pre-defined mashups and a canvas; interacting 305 with the user to define a visual configuration of the canvas and to drag and drop predefined mashups from the listing onto the canvas; surfacing 307 a parameter in the mashup into the dashboard; and if not done 309 with the mashup dashboard, looping to continue to interact 305 with the user. If the mashup dashboard is done 309, then the procedure 301 stores 311 the mashup dashboard and then ends 313. Each of these is sketched in some detail below, although much of the detail is discussed above.

The procedure 301 provides 303 a listing of pre-defined mashups and a canvas. That is, when the user determines to create a mashup dashboard, a listing of available mashups and other artifacts that can be used to create the mashup dashboard is listed. Typically, these mashups and other artifacts are stored in a repository. The listing can be a conventional file listing, such as a textual listing or icon listing or similar. The canvas is provided which can be a window or tab which can be configured and onto which the mashups (or other artifacts) are placed.

The procedure 301 interacts 305 with the user to define a visual configuration of the canvas and to drag and drop predefined mashups from the listing onto the canvas. Drag and drop can be conventional. When a selected predefined mashup is dropped onto the canvas, the mashup is run so as to be displayed within the perimeters of the canvas. Known techniques can be used to run the mashup.

The procedure 301 surfaces 307 a parameter in the mashup into the dashboard to be exposed to the user, as previously discussed in detail.

If not done 309 with the mashup dashboard, the procedure 301 loops to continue to interact 305 with the user.

On the other hand, if the mashup dashboard is done 309, then the procedure 301 stores 311 the mashup dashboard and then ends 313. The user can trigger the storing 311 of the mashup dashboard in any conventional manner, for example, by selecting "save" or "exit" from a menu.

Referring now to FIG. 4, is a flow chart illustrating a procedure 401 to use a mashup dashboard will be discussed and described. The procedure 401 can retrieve 401 the mashup dashboard from the repository; provide 405 a display which recreates the mashup dashboard; and allow 407 the user to interact with the mashup's parameter that is exposed to the user. Each of these is sketched in some detail below, although much of the detail is discussed above.

The procedure 401 can retrieve 401 the mashup dashboard from the repository. For example, a list of available mashup dashboards in the repository can be provided to the user. Conveniently, the available mashup dashboards can be listed along with available mashups. The user can select one of the listed mashup dashboards. Because the mashup dashboard can itself be a mashup, the mashup dashboard can be initiated as in conventional techniques for running a mashup.

The procedure 401 can provide 405 a display which recreates the mashup dashboard. The retrieved mashup dashboard specifies the configuration which the user's interface is to take, conveniently using HTML standards. Mashups within the mashup dashboard also are run, to obtain current real-time data within the display that recreates the mashup dashboard.

The procedure 401 can allow 407 the user to interact with the mashup's parameter that is exposed to the user, while the mashup is in the dashboard. This has been discussed in detail above. Then, the procedure 401 can end 409.

A concrete example is provided below to differentiate the mashup dashboard from a typical real estate "mashup" with real estate data on a map. The mashup dashboard can be created using a visual dashboard designer in a way which allows the users the capability to design the dashboard. Other applications such as Zillow are custom projects manually programmed by a person without drag and drop and the like.

In a very simple case, there is a user interface that lists mashlets or apps. The user drags one of the mashlets out onto the canvas, and then save this as the mashup dashboard titled "My New Dashboard". Behind the scenes, a composite widget is created containing the mashlet widget along with the configuration information, which is stored in the mashup repository on the mashup server side as "My New Dashboard". The configuration information is all saved a part of the widget. Known technology can be used to save the dashboard as a widget, for example, Presto software.

In the architecture, assume there is a mashup client and a mashup server as usual. At the mashup client, a user pulls up the mashup dashboard user interface to create a dashboard. The mashup client pulls in the list of apps, widgets, etc., from the mashup server. Then the dragging and dropping occurs by interacting with the user at the mashup client side. Then when the user saves the dashboard, it is saved at the mashup server.

To use the dashboard, the user obtains a list of dashboards, and selects one of the dashboards, for example by pulling it up on web browser as is usual. The client server goes off to mashup server that loads the dashboard onto the client server, and the dashboard looks like a web page to the user on the client server. The client server can use the configuration information in the mashup dashboard to render the dashboard in the usual way, (multiple tabbed pages, etc.) according to conventional techniques used to render mashup widgets.

Another other way to access the dashboard is to paste a scriptlet or a script onto a page. Each of the mashup widgets has an embedded script ("scriptlet") that can be pasted into a container which renders it using known techniques, e.g., as an HTML page in a browser or as a portal component

DEFINITIONS

It should be noted that the term "computer system" used herein denotes a device sometimes referred to as a computer, laptop, personal computer, personal digital assistants, personal assignment pads, or equivalents thereof provided such units are arranged and constructed for operation with a mashup or service.

The term "mashup" as used herein is defined to be a software application that combines pre-existing components from one or more information-providing services into a single tool which can comprise a server-side and a client-side application, where the components used by the mash-up are visually presented to a user on a display at the client-side in a manner which is different from the pre-determined presentation of the information-providing service; the teen "component" as used herein refers to data which is retrieved in real-time from an information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source. A "mashup", as the term is used herein, is expressly defined as being configured in accordance with mashup standards such as XML interchanged as REST (REpresentational State Transfer) or Web Services, RSS, Atom, and other evolutions and variations of mashup standards, or extracting data from a screen display output of a program on another site; but excluding simply linking to another site, such as through an HTML href. A mashup is to be distinguished from a portal in which content is presented side-by-side in the manner that is the same as the pre-determined presentation of the information-providing service.

The term "mashlet" used herein refers to a mashup that is a client side process that runs in the browser.

The term "service" is used herein expressly to refer to an information-providing service that provides data from a server in a visual presentation on a display to a user, typically an application programming interface (API) or web API that can be accessed over a computer network and executed on a remote system hosting the requested services, in accordance with Extensible Markup Language messages that follow the Simple Object Access Protocol (SOAP) standard, Web Services Description Language (WDSL), Representational State Transfer (REST) constraints, and variations and evolutions thereof. An example of a service is Google Maps, a Web service or an RSS feed.

The term "widget" as used herein is defined to be a stand-alone application which comprises a portable chunk of code that can be installed and executed within a separate HTML-based web page by an end user without requiring additional compilation. A widget frequently is written to use DHTML, JavaScript, or Adobe Flash, variations and evolutions thereof. Widgets often take the form of on-screen tools (clocks, event countdowns, auction-tickers, stock market tickers, flight arrival information, daily weather, etc.).

Furthermore, the computer networks of interest include those that transmit information in packets, for example, those known as packet switching networks that transmit data in the form of packets, where messages can be packetized and routed over network infrastructure devices to a destination. Such networks include, by way of example, the Internet, intranets, local area networks (LAN), wireless LANs (WLAN), wide area networks (WAN), and others, and can be supported by networking protocols such as TCP/IP (Transmission Control Protocol/Internet Protocol) and UDP/UP (Universal Datagram Protocol/Universal Protocol) and/or other protocol structures, and variants and evolutions thereof. Such networks can provide wireless communications capability and/or utilize wireline connections such as cable and/or a connector, or similar.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the computer system may be a general purpose computer, or a specially programmed special purpose computer. It may be implemented as a distributed computer system rather than a single computer. Similarly, a communications link may be World Wide Web, a modem over a POTS line, and/or any other method of communicating between computers and/or users. Moreover, the processing could be controlled by a software program on one or more computer system or processors, or could even be partially or wholly implemented in hardware.

One or more displays for the system may be provided in connection with HTML display format. Although HTML is the preferred display format, it is possible to utilize alternative display formats for interacting with a user and obtaining user instructions.

The above discussion has involved particular examples. However, the principles apply equally to other examples and/or realizations. Naturally, the relevant data may differ, as appropriate.

Further, the above has been discussed in certain examples as if it is made available by a provider to a single user with a single site. The above described system, device and/or method may be used by numerous users over distributed systems, if preferred.

The above has been described in connection with example data formats, for example XML and/or proprietary or public formats. However, it may be used in connection with other data formats, structured and/or unstructured, unitary and/or distributed.

The system used herein may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary primary interface with the user.

The various databases may be in, for example, a relational database format, but other standard data formats may also be used.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
   a display interface;
   a user input device interface; and
   a processor cooperatively operable with the display interface and the user input device interface, and configured to facilitate:
   providing, via the display interface, a listing of pre-defined mashups and a canvas, the pre-defined mashups being stored in a repository,
   interacting with a user via the display interface and the user input device interface to define a visual configuration of the canvas and to drag and drop one of the pre-defined mashups from the listing onto the canvas, and
   storing, in the repository, the visual configuration of the canvas with the pre-defined mashup as a mashup dashboard, for later retrieval to recreate the visual configuration with the pre-defined mashup executing therein, wherein
   the visual configuration includes first and second pre-defined mashups executing therein to provide live data,
   the processor is configured to facilitate interacting with the user via the display interface and the user input device interface to specify how the second pre-defined mashup maps live data from the first pre-defined mashup into different live data and visuals of the second pre-defined mashup.

2. The computer system of claim 1, a same mashup dashboard being re-schemed for different users, while a tab configuration and layout of the same mashup dashboard is persistent for the different users.

3. The computer system of claim 1, wherein the mashup dashboard further comprises a security policy for an individual mashup in the mashup dashboard that limits who can use the mashup from the mashup dashboard, the security policy being separate from a policy provided in the mashup itself.

4. The computer system of claim 1, wherein the mashup dashboard further comprises a security policy for a specific user interface area that appears in the mashup dashboard that prevents the specific user interface area from appearing for an unpermitted user.

5. The computer system of claim 1, the mashup dashboard interacting with the user to selectively plug in mashups from the repository by manual manipulation at the display interface.

6. The computer system of claim 1, further comprising saving a state of the mashup dashboard as a workspace app, and sharing the workspace app with other users of the dashboard by which the other users recreate a same visualized instance of the dashboard.

7. The computer system of claim 1, the mashup dashboard surfaces a parameter in the mashup into the dashboard to be exposed to the user, and the parameter while in the mashup interacts with the user.

8. The computer system of claim 1, wherein the mashup dashboard is published as a mashup to share with plural users.

9. A computer-implemented method for providing a mashup dashboard, comprising:
   retrieving a mashup dashboard from a repository;
   providing, via a display interface, a display of the retrieved mashup dashboard that recreates a visual configuration pre-defined in the stored mashup dashboard, the visual configuration including a pre-defined mashup executing therein to provide live data from the mashup, wherein
   the visual configuration includes first and second pre-defined mashups executing therein to provide the live data,
   the first pre-defined mashup provides the live data to the second pre-defined mashup which maps the live data of the first pre-defined mashup into different live data and visuals of the second pre-defined mashup as both are executing in the visual configuration.

10. The method of claim 9, further comprising:
   providing, via a display interface, a listing of pre-defined mashups and a canvas, the pre-defined mashups being stored in the repository, interacting with the user, via the display interface and a user input device interface, to define a visual configuration of the canvas and to drag and drop one of the pre-defined mashups from the listing onto the canvas, and storing, in the repository, the visual configuration of the canvas with the pre-defined mashup as a mashup dashboard, for later retrieval to recreate the visual configuration with the pre-defined mashup executing therein.

11. The method of claim 9, further comprising re-scheming a same mashup dashboard for different users, while a tab configuration and layout of the same mashup dashboard is persistent for the different users.

12. The method of claim 9, wherein the mashup dashboard further comprises a security policy for an individual mashup in the mashup dashboard that limits who can use the mashup from the mashup dashboard, the security policy being separate from a policy provided in the mashup itself.

13. The method of claim 9, wherein the mashup dashboard further comprises a security policy for a specific user interface area that appears in the mashup dashboard that prevents the specific user interface area from appearing for an unpermitted user.

14. The method of claim 9, the mashup dashboard interacting with the user to selectively plug in mashups from the repository by manual manipulation at the display interface.

15. The method of claim 9, the mashup dashboard surfacing a parameter in the mashup into the dashboard to be exposed to the user, and the parameter while in the mashup interacting with the user.

16. The method of claim 9, further comprising publishing the mashup dashboard as a mashup to share with plural users.

17. A non-transitory computer-readable medium comprising instructions for execution by a computer, the instructions including a computer-implemented method for providing a mashup dashboard, the instructions for implementing:

creating a mashup dashboard, including providing, via a display interface, a listing of pre-defined mashups and a canvas, the pre-defined mashups being stored in a repository, interacting with the user, via the display interface and a user input device interface, to define a visual configuration of the canvas and to drag and drop one of the pre-defined mashups from the listing onto the canvas, and storing, in the repository, the visual configuration of the canvas with the pre-defined mashup as a mashup dashboard, for later retrieval to recreate the visual configuration with the pre-defined mashup executing therein; and using the mashup dashboard, including retrieving the mashup dashboard from the repository;

providing, via the display interface, a display of the retrieved mashup dashboard that recreates a visual configuration pre-defined in the stored mashup dashboard, the visual configuration including a pre-defined mashup executing therein to provide live data from the mashup, wherein the visual configuration includes first and second pre-defined mashups executing therein to provide the live data, the instructions for using the mashup dashboard include:

providing the live data from the first pre-defined mashup to the second pre-defined mashup which maps the live data of the first pre-defined mashup into different live data and visuals of the second pre-defined mashup as both are executing in the visual configuration, the instructions for creating the mashup dashboard include:

interacting with the user via the display interface and the user input device interface to specify how the second pre-defined mashup maps the live data from the first pre-defined mashup into the different live data and visuals of the second pre-defined mashup.

18. The computer-readable medium of claim 17, further comprising instructions for re-scheming a same mashup dashboard for different users, while a tab configuration and layout of the same mashup dashboard is persistent for the different users.

19. The computer-readable medium of claim 17, wherein the mashup dashboard further comprises a security policy for an individual mashup in the mashup dashboard that limits who can use the mashup from the mashup dashboard, the security policy being separate from a policy provided in the mashup itself.

20. The computer-readable medium of claim 17, wherein the mashup dashboard further comprises a security policy for a specific user interface area that appears in the mashup dashboard that prevents the specific user interface area from appearing for an unpermitted user.

21. The computer-readable medium of claim 17, the mashup dashboard interacting with the user to selectively plug in mashups from the repository by manual manipulation at the display interface.

22. The computer-readable medium of claim 17, further comprising saving a state of the mashup dashboard as a workspace app, and sharing the workspace app with other users of the dashboard by which the other users recreate a same visualized instance of the dashboard.

23. The computer-readable medium of claim 17, further comprising instructions for surfacing a parameter in the mashup in the mashup dashboard to be exposed to the user, wherein the parameter while in the mashup interacts with the user.

24. The computer-readable medium of claim 17, further comprising publishing the mashup dashboard as a mashup to share with plural users.

* * * * *